L. L. RICH.
MOLDING MACHINE.
APPLICATION FILED SEPT. 25, 1909.
944,747.
Patented Dec. 28, 1909.
3 SHEETS—SHEET 1.
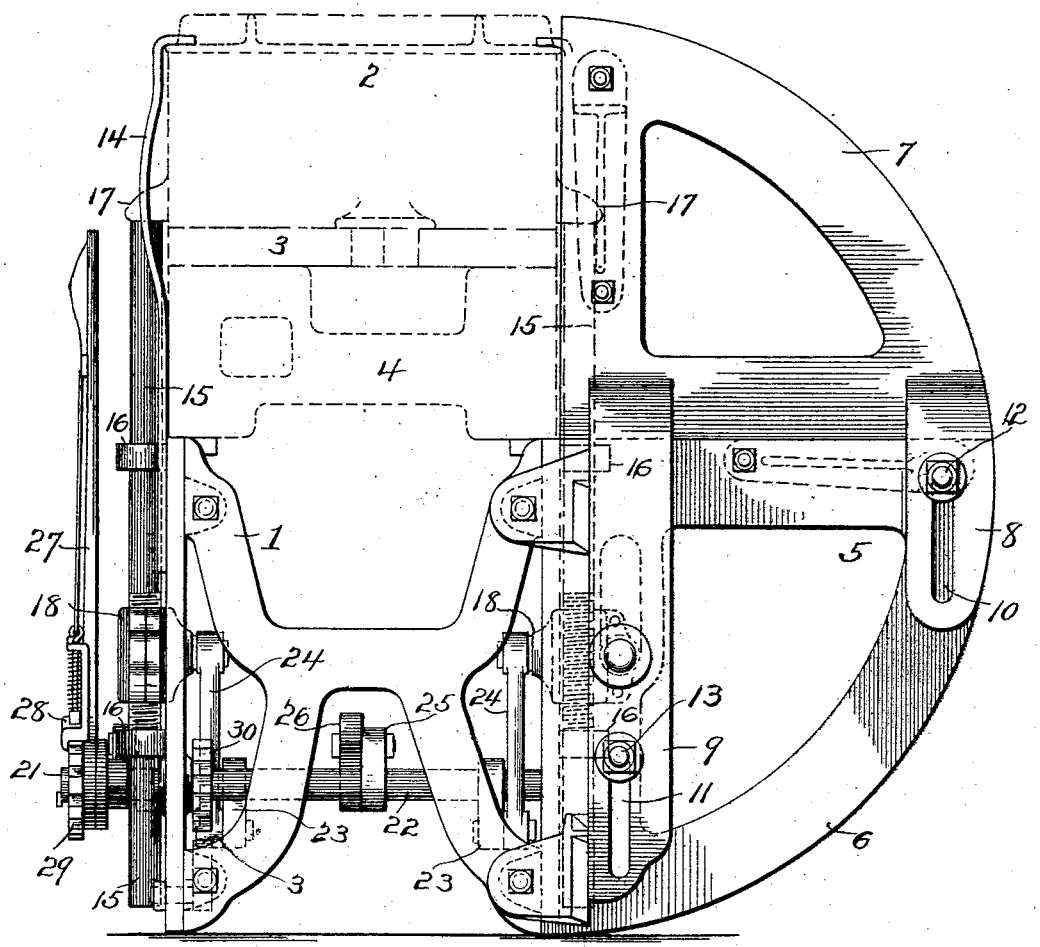
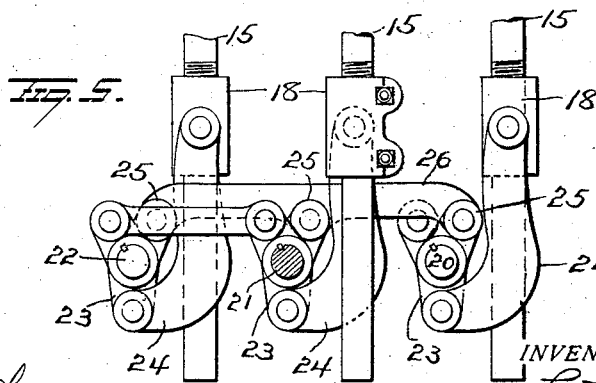
WITNESSES
E. J. Nottingham
G. F. Downing
INVENTOR
L. L. Rich
By H. A. Seymour
Attorney

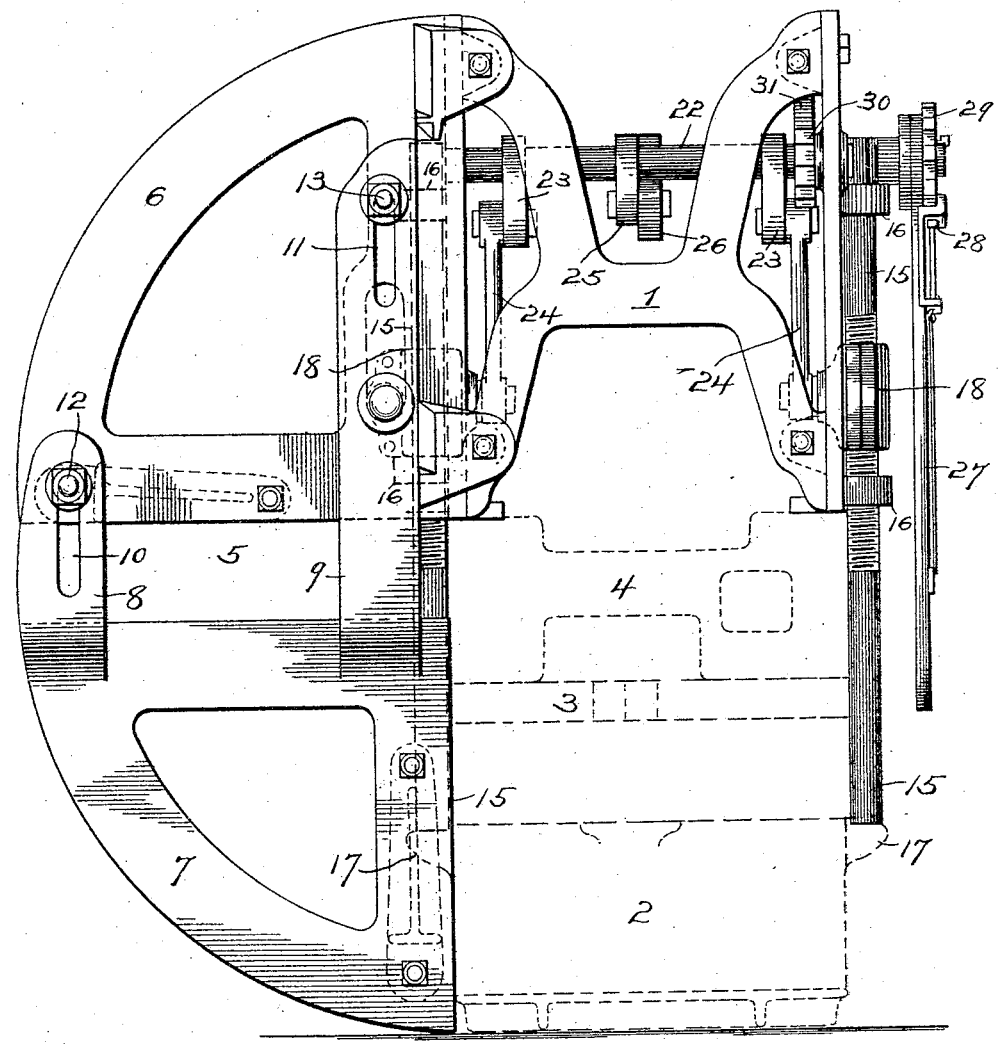

L. L. RICH.
MOLDING MACHINE.
APPLICATION FILED SEPT. 25, 1909.
944,747.
Patented Dec. 28, 1909.
3 SHEETS—SHEET 3.
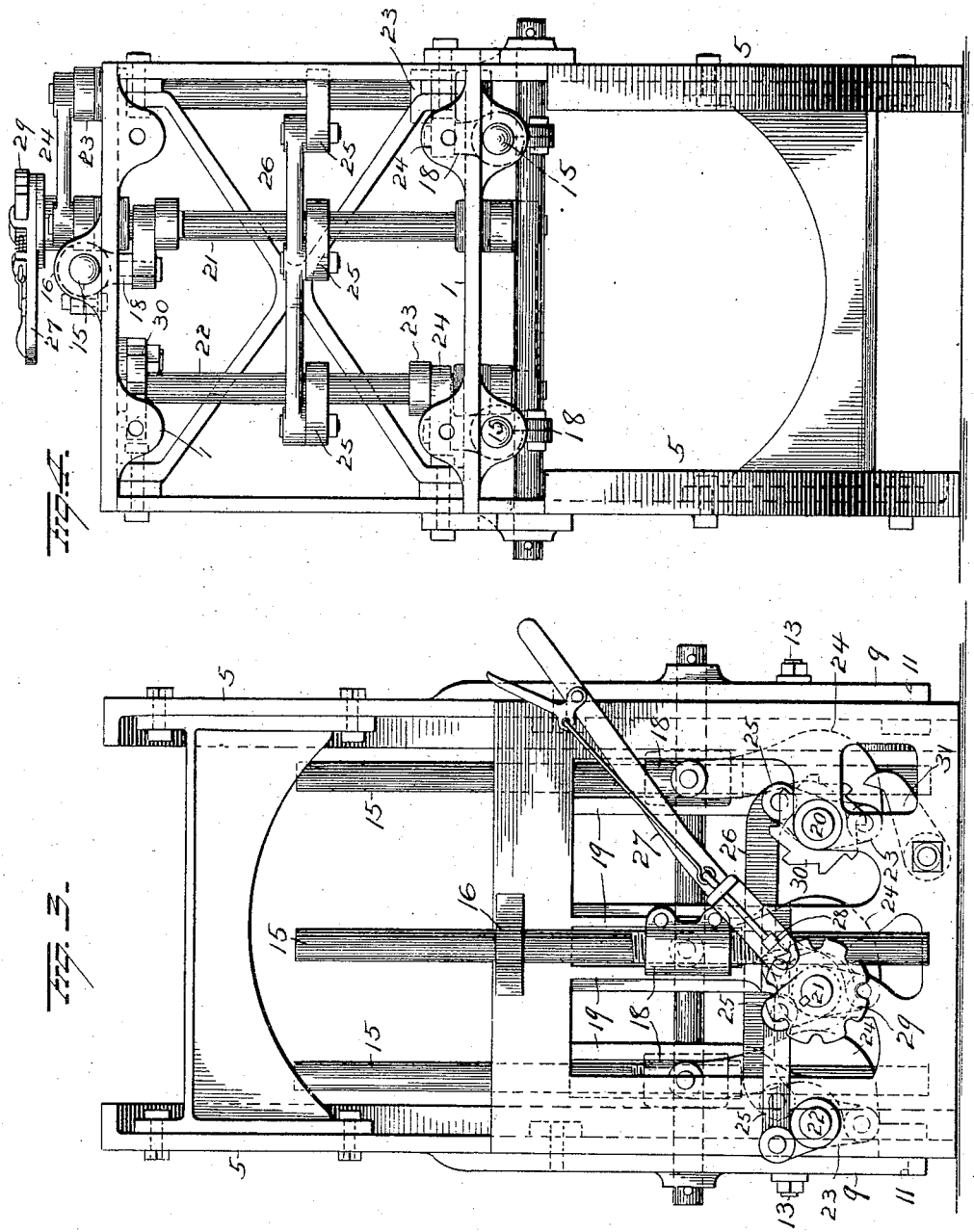
WITNESSES
INVENTOR

UNITED STATES PATENT OFFICE

LEWIS L. RICH, OF SOUTH BEND, INDIANA, ASSIGNOR TO OLIVER CHILLED PLOW WORKS, OF SOUTH BEND, INDIANA.

MOLDING-MACHINE.

944,747.

Specification of Letters Patent.  Patented Dec. 28, 1909.

Application filed September 25, 1909. Serial No. 519,588.

*To all whom it may concern:*

Be it known that I, LEWIS L. RICH, a resident of South Bend, in the county of St. Joseph and State of Indiana, have invented certain new and useful Improvements in Molding-Machines; and I do hereby declare the following to be a full, clear, and exact description of the invention, such as will enable others skilled in the art to which it appertains to make and use the same.

This invention relates to improvements in molding machines, the object of the invention being to construct a molding machine in such manner that the operator will be materially assisted in the handling of delicate molds and also those which are too heavy to be handled by one man.

A further object is to construct a molding machine in such manner that it can be easily rocked to reverse the position of the mold and deposit the same upon the floor or other suitable support and so that the machine can be raised from the mold, rocked back to a position to receive another mold and then adjusted to proper position so that the latter can be placed thereon.

A further object is to provide a molding machine having a divided rocker, with means for separating the members of said rocker to raise the machine from a mold and subsequently to close the rocker members to their normal positions.

With these objects in view the invention consists in certain novel features of construction and combinations of parts as hereinafter set forth and pointed out in the claims.

In the accompanying drawings, Figure 1 is a side elevation of a machine showing an embodiment of my invention. Fig. 2 is a similar view showing the machine inverted and the rocker members separated after the flask has been deposited. Fig. 3 is a front view. Fig. 4 is a plan view, and Fig. 5 is a detail view of some of the operating devices.

1 represents a substantial frame which constitutes a support for a flask 2 and a carrying or stripping plate 3 and, in some cases an intermediate supplemental frame 4 disposed between the plate 3 and the main frame 1.

A rocker 5 is connected with the frame 1 for the purpose of rocking said frame with the mold thereon to invert the latter and place it upon the floor or other suitable support. The rocker 5 comprises two members 6—7,— the member 6 being rigidly secured to the frame 1 and the member 7 being movably connected with the member 6. In effecting such connection between the rocker members, the member 7 is provided at each side with two arms 8 and 9 having slots 10, 11 for the passage of bolts 12, 13, which enter the member 6 of the rocker. The frame and rocker constructed and arranged as above described, constitute a cradle for the reception of the molding devices.

With the machine in the position shown in Fig. 1, the mold flask 2 and the plate 3 and (if necessary to cause the flask to extend to the end of the rocker according to the height of flask used or the thickness of the molding plates) a supplemental frame 4 are placed in position upon the frame 1 and the mold flask clamped in place by means of suitable clamping bars 14. After the flask has been filled and rammed in the usual manner and secured in place as above described, the machine is ready to be turned on the rocker 5 so as to invert the position of the flask and permit it to rest upon the floor, as shown in Fig. 2. The supplemental frame 4 and the plate 3 having been secured to the frame of the machine, it is apparent that after the clamping bars 14 shall have been removed, the raising of the frame from the flask will be permitted but such raising renders necessary that one portion of the rocker shall be movable relatively to the other portion, hence the importance of making the rocker in two members which are relatively movable.

For the purpose of raising the frame from the flask and simultaneously dividing the rocker so that the machine can be rocked away from the flask and made to assume its normal position, as shown in Fig. 1, the mechanism now to be described has been found to be efficient.

A series of lifting bars 15 pass through guiding lugs 16 on frame 1 and are adapted to engage lugs or projections 17 on the flask. At their other ends the lifting bars are threaded and adjustably connected with clamps 18 mounted to move between guides 19 in the frame 1. A series of shafts 20, 21 and 22 are mounted in the frame 1 and provided with crank-arms 23 connected respectively by means of rods or pitmen 24 with the clamps 18. The several shafts are also provided with cranks 25 connected by a pitman 26 so that when one of said shafts is turned, motion will be transmitted to the others to move all the lifting bars simultaneously. The intermediate shaft 21 has mounted thereon, exteriorly of the frame 1, an operating lever 27 provided with a dog 28 to engage the notches of a wheel 29 rigidly secured to said shaft. The shaft 22 is provided with a ratchet wheel 30 with which a dog 31 is adapted to coöperate, this dog being so located that when the machine is in an upright position, such as shown in Figs. 1 and 3, it will be out of engagement with the ratchet wheel. When the machine is rocked from the position shown in Fig. 1 to the reverse position with the flask resting upon the floor, the operator after having removed the clamping bars 14, will operate the lever 27 to turn the several shafts 20, 21 and 22 and thus cause downward movement of the lifting bars, but as these lifting bars are resting at their lower ends upon the lugs on the flask, the tendency to move the lifting bars downwardly will result in raising the frame 1 and with it the member 6 of the rocker, thus separating the rocking members as shown in Fig. 3, and when this occurs, the dog 31 will drop into engagement with the ratchet wheel 30 and the rocker members will be locked in their separated positions. The machine may now be rocked away from the flask and caused to again assume the position shown in Fig. 1. A slight movement now of the operating lever will relieve frictional engagement between the dog 31 and the ratchet wheel 30 and the operator can with the use of the lever 27, lower the frame in position to receive another flask and simultaneously close the member 6 of the rocker down upon the member 7 thereof.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is,—

1. In a molding machine, the combination of a cradle having a curved portion on which the same can be rocked, and means for attaching molding devices to said cradle.

2. In a molding machine, the combination of a cradle and means for attaching molding means to said cradle, said cradle having a segmental rocker on which it can be rolled to invert the molding means.

3. In a molding machine, the combination of a rocking cradle, means for attaching molding means thereto, and means for raising the cradle from said molding means after the latter shall have been inverted and deposited.

4. In a molding machine, the combination of a rocking mold-carrying cradle for inverting a mold, and means for removing said cradle from the inverted mold after the latter shall have been deposited.

5. In a molding machine, the combination with a frame adapted for the reception of molding means, of a rocker attached to said frame and comprising two members which are relatively movable.

6. In a molding machine, the combination with a frame adapted for the reception of molding means, of a divided rocker attached to said frame, and means for moving said frame and one portion of the rocker relatively to the other portion of said rocker.

7. In a molding machine, the combination with a frame adapted for the reception of molding means, of a rocker connected with said frame and comprising two members, one movable with relation to the other, and means carried by said frame for raising the latter and one rocker member away from the other rocker member.

8. In a molding machine, the combination with a frame adapted for the reception of molding means, of a divided rocker comprising relatively movable members attached to said frame, lifting bars mounted in the frame, and means also mounted in the frame and coöperating with said lifting bars to raise the frame and one rocker member from the molding means and the other rocker member.

9. In a molding machine, the combination with a frame adapted for the reception of molding means, of a divided rocker comprising relatively movable members connected with said frame, a series of rock shafts provided with crank arms, an operating lever for turning said rock shafts, and lifting bars mounted in the frame and connected with said rock shafts for effecting the raising of the frame and one rocker member from the other rocker member when said lever is operated in one direction.

10. In a molding machine, the combination with a frame adapted for the reception of molding means, of a divided rocker comprising relatively movable members, means for separating one rocker member from the other to raise the frame from the molding means, and means for locking the rocker members separated while the machine is being rocked from one molding means to position for receiving another molding means.

In testimony whereof, I have signed this specification in the presence of two subscribing witnesses.

LEWIS L. RICH.

Witnesses:
WILLIAM L. PAUL,
DONALD A. HIMES.